(12) United States Patent
Kitada et al.

(10) Patent No.: US 8,130,832 B2
(45) Date of Patent: Mar. 6, 2012

(54) VIDEO DECODING DEVICE AND VIDEO DECODING METHOD

(75) Inventors: Noriaki Kitada, Tokorozawa (JP); Katsuhisa Yano, Hachioji (JP); Kosuke Uchida, Ome (JP); Satoshi Hoshina, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1204 days.

(21) Appl. No.: 11/856,911

(22) Filed: Sep. 18, 2007

(65) Prior Publication Data
US 2008/0240244 A1 Oct. 2, 2008

(30) Foreign Application Priority Data
Mar. 28, 2007 (JP) ................................ 2007-085768

(51) Int. Cl.
*H04N 7/12* (2006.01)

(52) U.S. Cl. .............................. 375/240.12; 375/249.16
(58) Field of Classification Search .................... None
See application file for complete search history.

(56) References Cited

U.S. PATENT DOCUMENTS

| | | | |
|---|---|---|---|
| 2004/0062307 A1* | 4/2004 | Hallapuro et al. | 375/240.13 |
| 2006/0067406 A1* | 3/2006 | Kitada et al. | 375/240.16 |
| 2006/0203917 A1* | 9/2006 | Uchida et al. | 375/240.24 |
| 2007/0177667 A1* | 8/2007 | Subramania et al. | 375/240.12 |
| 2007/0189735 A1* | 8/2007 | Kawashima et al. | 386/112 |
| 2007/0237235 A1* | 10/2007 | Krishnan | 375/240.18 |

FOREIGN PATENT DOCUMENTS

| | | |
|---|---|---|
| JP | 2006-101322 | 4/2006 |
| JP | 2006-101405 A | 4/2006 |

* cited by examiner

*Primary Examiner* — Phirin Sam
(74) *Attorney, Agent, or Firm* — Foley & Lardner LLP (57) ABSTRACT

A video decoding device includes: a decoder that decodes an encoded video bit stream to generate a prediction error signal; a motion compensator that performs a motion compensation prediction using a motion vector that refers at least one picture to generate a motion compensation prediction signal; a weighted predictor that generates a weighted prediction signal from a linear sum of (1) a product of the motion compensation prediction signal and a first weighting coefficient and (2) a second weighting coefficient; a selector that selects one of the motion compensation prediction signal and the weighted prediction signal; and an adder that adds (1) selected one of the weighted prediction signal and the motion compensation prediction signal and (2) the prediction error signal.

4 Claims, 6 Drawing Sheets

| SLICE TYPE | KINDS OF PREDICTION | PREDICTION SIGNALS | MANNERS TO DETERMINE COEFFICIENTS W AND D |
|---|---|---|---|
| P-SLICE | L0 PREDICTION | $W_0 Y_0 + D_0$ | SEND COEFFICIENTS $W_0$ AND $D_0$ |
| B-SLICE | L0 PREDICTION, L1 PREDICTION | $W_0 Y_0 + D_0$ or $W_1 Y_1 + D_1$ | SEND COEFFICIENTS $W_0$, $W_0$, $D_1$ AND $D_2$ (Explicit MODE) |
| | Bi-predictive PREDICTION | $W_0 Y_0 + W_1 Y_1 + D$<br>$D = (D_0 + D_1)/2$ | CALCULATE FROM DISTANCES FROM REFERENCED PICTURE (Implicit MODE) |

FIG. 6

VIDEO DECODING DEVICE AND VIDEO DECODING METHOD

CROSS-REFERENCE TO RELATED APPLICATIONS

This application is based upon and claims the benefit of priority from Japanese Patent Application No. 2007-085768, filed on Mar. 28, 2007, the entire contents of which are incorporated herein by reference.

BACKGROUND

1. Field

One embodiment of the invention relates to a video decoding device and a video decoding method.

2. Description of the Related Art

Recently, a number of pieces of information processing apparatus is increasing, the information processing apparatus being, for example, a PC (Personal Computer) or the like, which can decode an encoded video bit stream being encoded in conformance with an encoding scheme such as H.264/AVC (hereinafter also referred to simply as "H.264") or the like. However, the decoding operation of the video bit stream encoded in the encoding scheme such as the H.264 requires a large amount of calculation power, and may be delayed if all calculations are performed. It is considered that the decoding operation is performed by the dedicated GPU (Graphics Processing Unit). However, the calculating speed for the specific prediction method for the weighting prediction or the like becomes significantly slow in dependence upon the characteristics of the GPU as may cause a delay.

Several methods for reducing the load on the decoding of the encoded video bit stream have been conceived (as referred to JP-A-2006-101405, for example). The document JP-A-2006-101405 discloses an information processing device that omits decoding a picture unreferred from another picture.

In the method described in the document JP-A 2006-101405, however, the picture unreferred from another picture is instantly determined not to be decoded, thus raising a problem that the image quality will be deteriorated.

SUMMARY

According to a first aspect of the present invention, there is provided a video decoding device including: a decoder that decodes an encoded video bit stream to generate a prediction error signal; a motion compensator that performs a motion compensation prediction using a motion vector for at least one referenced picture to generate a motion compensation prediction signal; a weighted predictor that generates a weighted prediction signal from a linear sum of (1) a product of the motion compensation prediction signal and a first weighting coefficient and (2) a second weighting coefficient; a selector that selects one of the motion compensation prediction signal and the weighted prediction signal; and an adder that adds (1) selected one of the weighted prediction signal and the motion compensation prediction signal and (2) the prediction error signal.

According to a second aspect of the present invention, there is provided a video decoding method including: decoding an encoded video bit stream to generate a prediction error signal; performing a motion compensation prediction using a motion vector for at least one referenced picture to generate a motion compensation prediction signal; generating a weighted prediction signal from a linear sum of (1) a product of the motion compensation prediction signal and a first weighting coefficient and (2) a second weighting coefficient; selecting one of the motion compensation prediction signal and the weighted prediction signal; and adding (1) selected one of the weighted prediction signal and the motion compensation prediction signal and (2) the prediction error signal.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

A video decoding device and a video decoding method according to the present invention are described in the following with reference to the accompanying drawings.

Figure 1:
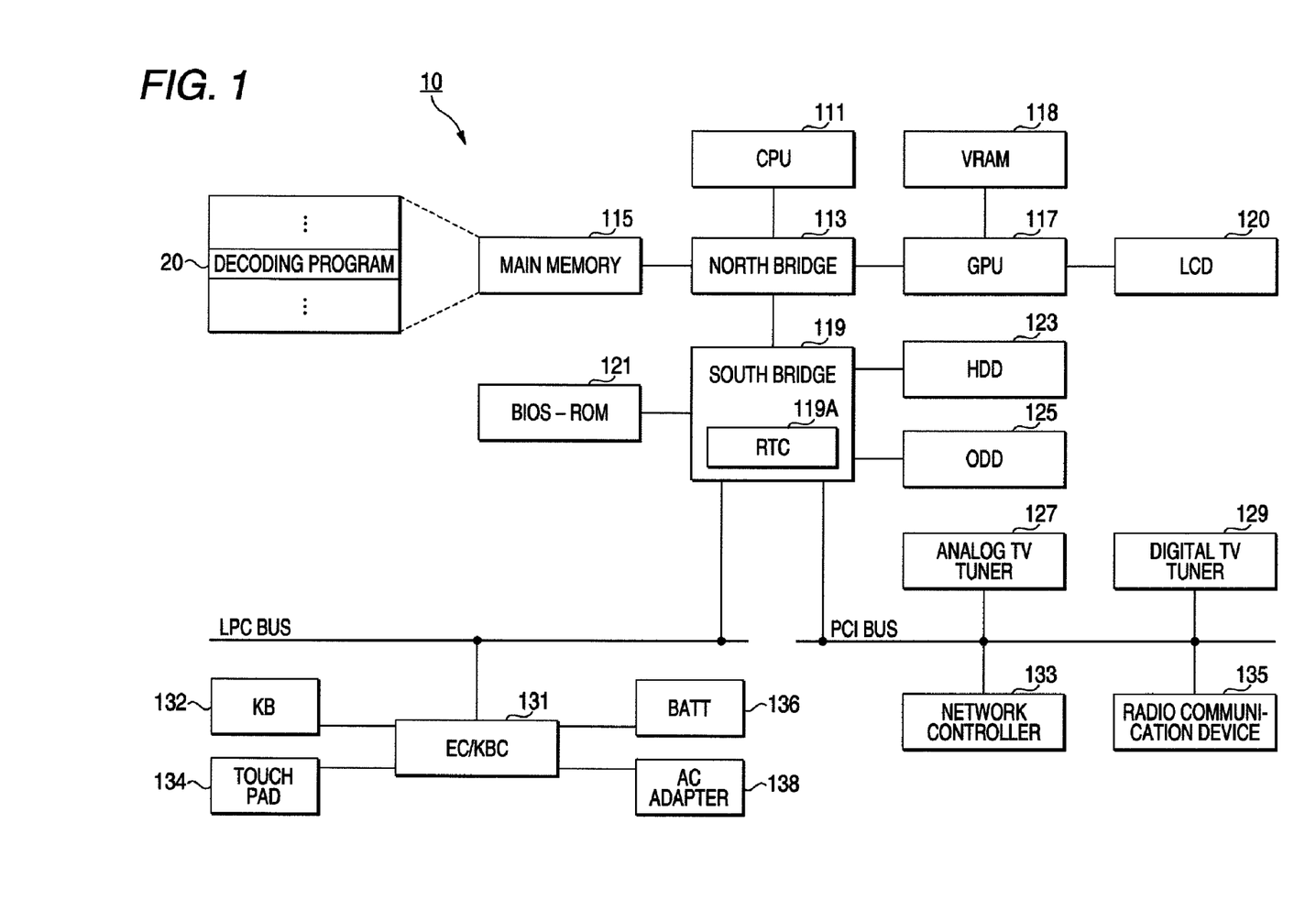
FIG. 1 is a diagram showing a configuration of a computer according to an embodiment of the present invention.

A configuration of a computer of an embodiment of a video decoding device of the invention is described with reference to FIG. 1. FIG. 1 is a diagram showing a configuration of the computer as the video decoding device according to an embodiment.

The computer 10 is configured, as shown in FIG. 1, to include a CPU 111, a north bridge 113, a main memory 115, a graphical processing unit (GPU) 117, a VRAM 118, a south bridge 119, a BIOS-ROM 121, a hard disk drive (HDD) 123, an optical disk drive (ODD) 125, an analog TV tuner 127, a digital TV tuner 129, an embedded controller/keyboard controller IC (EC/KBC) 131, a network controller 133 and a radio communication device 135.

The CPU 111 is a processor provided for controlling the operations of the computer 10, and executes various programs such as the operating system (OS) to be loaded in the main memory 115 from the HDD 123, a decoding program 20 and so on. The decoding program 20 is a program for decoding the encoded video bit stream, which is encoded by an encoding method such as H.264. The encoded video bit stream to be decoded by the decoding program 20 is exemplified by one read by the ODD 125 from the HD-DVD (High-Definition Digital Versatile Disk), or one received by the digital TV tuner 129.

The decoding program 20 decodes the encoded video bit stream over the GPU 117 and the CPU 111. This processing will be described hereinafter.

The CPU 111 also executes the BIOS (Basic Input Output System) stored in the BIOS-ROM 121. The BIOS is a program for the hardware control.

The north bridge 113 is a bridge for connecting the local bus of the CPU 111 and the south bridge 119. The north bridge 113 also has a memory controller built therein for access-controlling the main memory 115. Moreover, the north bridge 113 has a function to execute the communications with the GPU 117 through an PCI Express bus or the like.

The GPU 117 is a display controller for controlling an LCD (Liquid Crystal Display) 120 to be used as the display monitor of the computer. This GPU 117 displays the image data, which has been written in the VRAM 118 by the OS or the like, on the LCD 120. As described hereinbefore, the GPU 117 has another function to decode the encoded video bit stream under the control of the decoding program 20.

The south bridge 119 controls the individual devices on an LPC (Low Pin Count) bus and the individual devices on a PCI (Peripheral Component Interconnect). Moreover, the south bridge 119 has an IDE (Integrated Drive Electronics) controller built therein for controlling the HDD 123 and the ODD 125.

Moreover, the south bridge 119 is provided with a real time clock (RTC) 119A. This RTC 119A functions as a time module for timing the present time (year, month, date, hour, minute and second).

The analog TV tuner 127 and the digital TV tuner 129 are receiver units for receiving the broadcasting program data, which is broadcast by each of broadcasting waves. In the embodiment, the analog TV tuner 127 is configured of an analog TV tuner for receiving the broadcasting program data broadcast by analog broadcasting signals, and the digital TV tuner 129 is configured of a digital TV tuner for receiving the broadcasting program data broadcast by ground-wave digital broadcasting signals.

The EC/KBC 131 is a one-chip microcomputer, in which an embedded controller for power management and a keyboard controller for controlling a keyboard (KB) 132 and the touch pad 135 are integrated. The EC/KBC 131 has a function to power ON/OFF the computer 10 in response to the operation of the power button by the user. The power to be fed to the individual components of the computer is generated by either a battery 136 built in the computer 10 or an external power fed from an external AC adapter 138.

The network controller 133 is a device for acquiring connections with a wired network, and is used to execute the communications with the external network such as the Internet. On the other hand, the radio communication device 135 is a device for connections with the radio network, and is used for one-to-one radio communications with another radio communication device or for communications with the external network such as the Internet.

Figure 2:
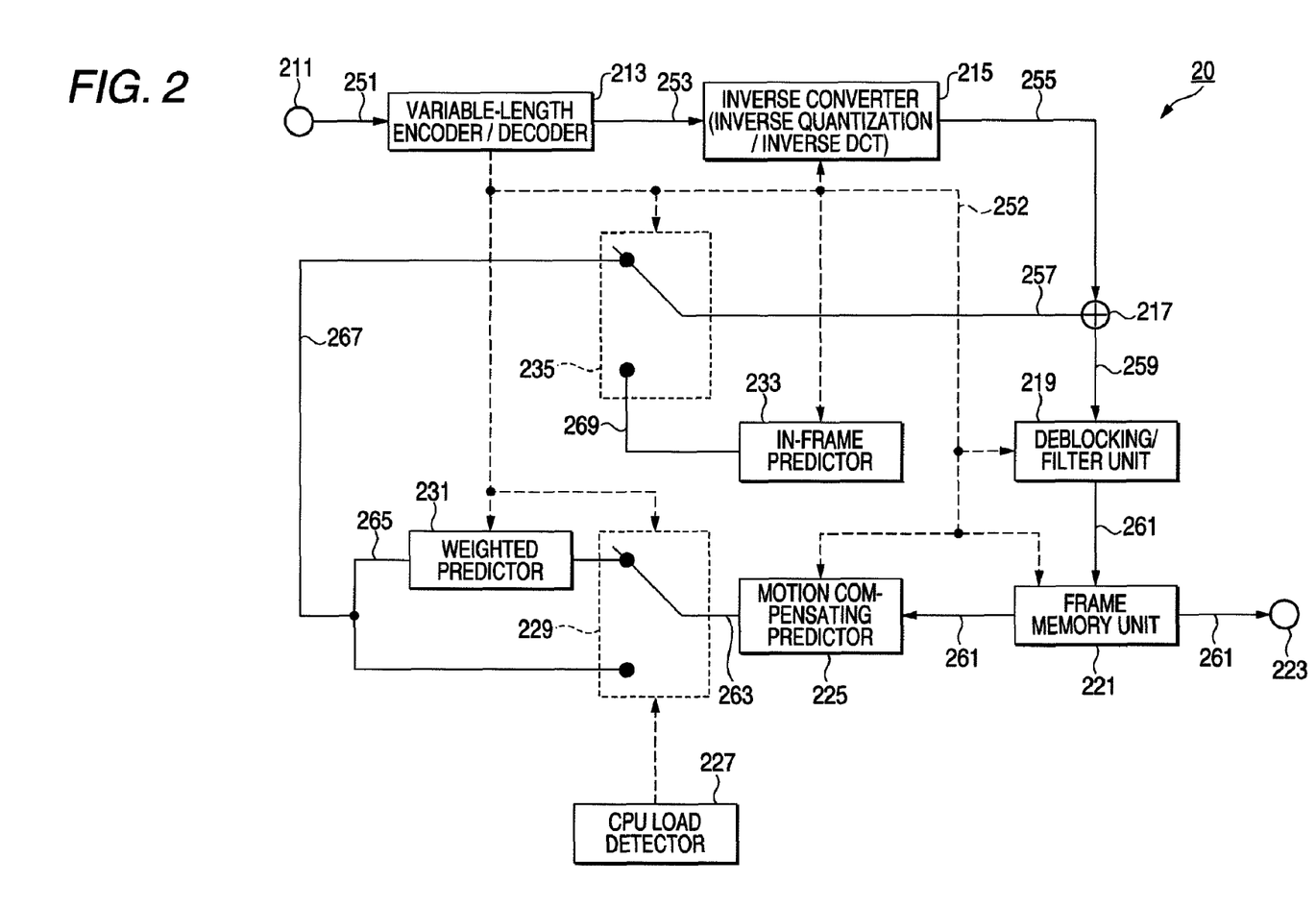
FIG. 2 is a diagram showing a configuration of a decoding program according to the embodiment.

A configuration of the decoding program 20 is described with reference to FIG. 2. FIG. 2 shows the configuration of the decoding program 20 for decoding the encoded video bit stream based on the standard of H.264/AVC. Here, the decoding program 20 shown in FIG. 2 performs the decoding operations by using the CPU 111 and the GPU 117, as has been described hereinbefore.

An encoded video bit stream 251 is inputted from an input terminal 211. This encoded video bit stream 251 is outputted to an entropy decoder 213. The entropy decoder 213 decodes the encoded video bit stream 251, which has been subjected to the variable-length encoding, into the inverse quantized DCT coefficient data 253 (as expressed by the IDCT, although the IDCT is different because the conversion of H.264/AVC is performed by an integer calculation). The entropy decoder 213 performs the analyzing operations of various kinds of parameter information, which are obtained by variable-length decoding the encoded video bit stream 251, such as motion vector information or prediction mode information. The various control signals 281 obtained by this analyzing operation are suitably fed to the individual constitutions of the decoding program 20.

A inverse quantized DCT coefficient data 253 outputted from the entropy decoder 213 is inputted to an inverse converter 215. The inverse quantized DCT coefficient data 253 is encoded into a prediction error signal 255 by the inverse quantization and the inverse DCT (Inverse Discrete Cosine Transform) transformation.

A prediction error signal 255 decoded by the inverse converter 215 is added at an adder 217 to a prediction image signal 257 so that it is reproduced as a decoded image signal 259. This decoded image signal 259 is reduced in block distortion by a deblocking filter unit 219. An output image signal 261 thus reduced in the block distortion is outputted to/stored in a frame memory unit 221, and is outputted in a predetermined output order from an output terminal 223.

A motion compensation predictor 225 selects the output image signal 261 stored in the frame memory unit 221, by a motion compensation prediction with the information such as that of a referenced picture of the motion vector obtained as a control signal 252. The motion compensation predictor 225 outputs a motion compensation prediction signal 263 obtained by the motion compensation prediction.

A CPU load detector 227 detects whether or not a high load is applied to the CPU 111. This detection can be made in dependence upon whether or not the decoding operation has been delayed.

A switch 229 switches it in response to the detection result of the CPU load detector 227, for example, whether or not the weighted prediction is to be made upon the motion compensation prediction signal 263. In case the CPU load detector 227 detects that a high load is applied to the CPU 111, the weighted prediction is omitted to lighten the calculation load of the weighted prediction. At this time, it is assumed that the omission of the weighted prediction is the unreferenced B-picture. This is because the omission of the weighted prediction in the referenced B-picture cause the error propagation to another picture referring to that picture thereby to cause the image quality degradation. In case the GPU 117 is slow in the calculating speed for the weighted prediction, for example, the switch 229 may be controlled to omit the weighted prediction at the decoding time of the GPU 117.

A weighted predictor 231 performs the prediction by weighting the brightness (or luminance) on the motion compensation prediction signal 263 by using the weighting coefficient or the like obtained as the control signal 252, thereby to output the weighted prediction signal 265.

By the control of the switch 229, either the motion compensation prediction signal 263 or a weighted prediction signal 265 becomes an inter-frame prediction signal 267 obtained by the inter-frame predicting operation.

In case the picture is encoded in the intra prediction mode, on the other hand, an intra predictor 233 generates and outputs an intra prediction signal 269 on the basis of the control signal 252.

The switch 235 switches, on the basis of the prediction mode information obtained as the control signal 252, which of the inter-frame prediction signal 267 or the intra prediction signal 269 is to be outputted as the prediction image signal to the adder 217.

Figure 3:
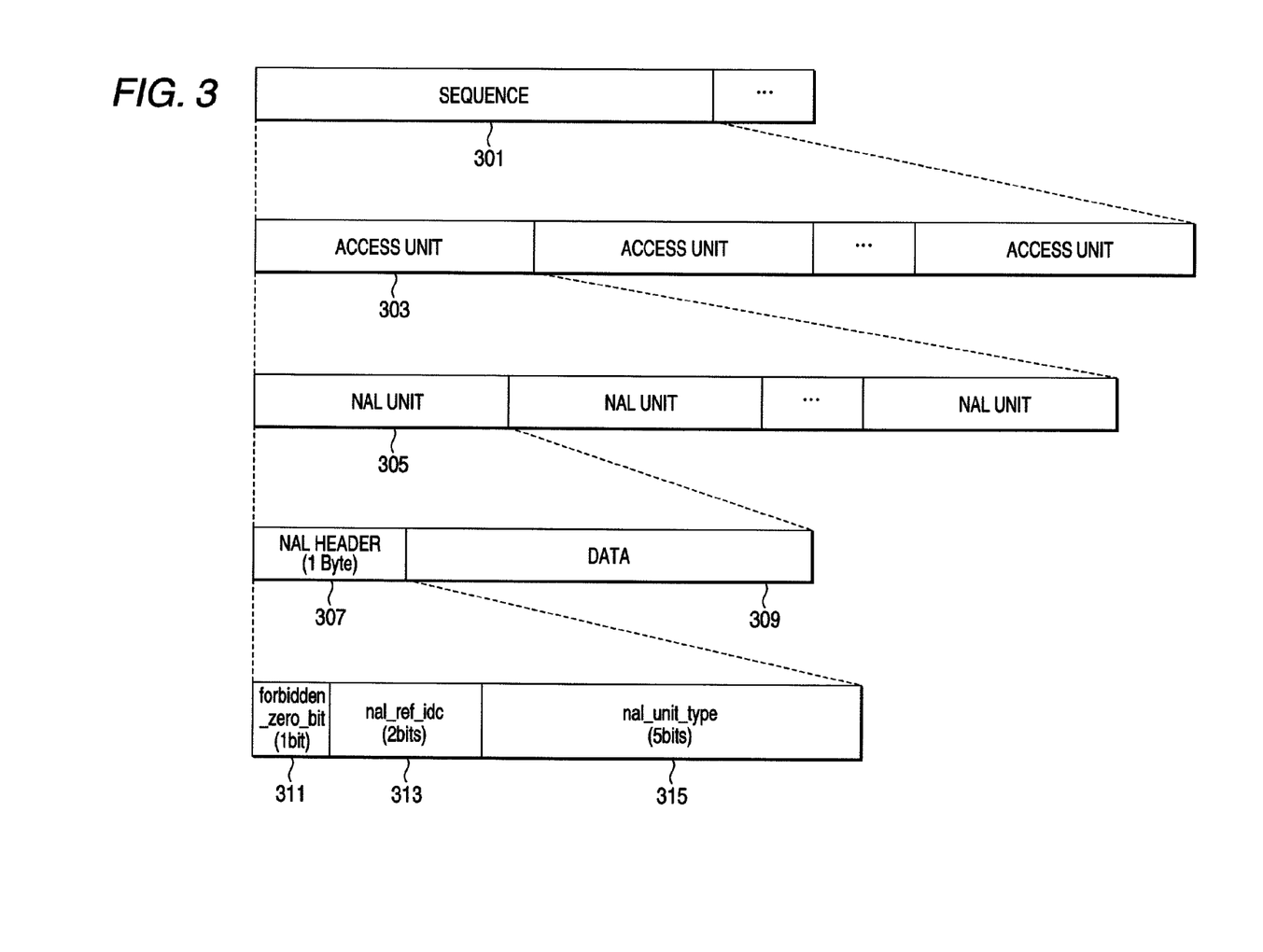
FIG. 3 is a diagram showing a hierarchical structure of an encoded video sequence to be decoded by the computer.

Subsequently, with reference to FIG. 3, description is made on the hierarchical structure of the encoded video bit stream 251 to be decoded by the decoding program 20 in accordance with the H.264 standard. FIG. 3 is a diagram showing the hierarchical structure of the encoded video bit stream 251.

The encoded video bit stream 251 is expressed as a sequence 301. The sequence 301 may be two or more. One sequence 301 includes one or more access units 303. One access unit includes a plurality of NAL (Network Abstraction Layer) units 305.

The NAL unit 305 is coarsely divided into a VCL NAL unit to be stored with a video encoded data generated by the video coding layer for performing the video encoding operation, as will be simply called the "VCL", and a non-VCL NAL unit for storing the various parameter sets, such as SPS (Sequence Parameter Set) or PPS (Picture Parameter Set). Here, the NAL is a layer between the VCL and a subordinate layer for transmitting/storing the encoded information, and correlates the VCL and the subordinate system.

The NAL unit 305 is configured of a NAL header 307 of 1 byte, and a portion of an RBSP (Raw Byte Sequence Payload: data 309 in FIG. 3) stored with the information obtained in the VCL.

A NAL header 107 is configured of a forbidden_zero_bid 311 (at a fixed value "0") of one bid, a nal_ref_idc 313 of two bids, and a nal_unit_type 315 of 5 bits. The kind of the NAL unit 305 can be discriminated by the nal_unit_type 315. On the other hand, the nal_ref_idc 313 is a flag indicating whether or not the picture is the non-reference picture. With reference to the nal_ref_idc 313, the decoding program 20 can decide the referenced picture, if not 0, and the non-referenced picture, if 0. The switch 229 makes such a control on the B-picture of the nal_ref_idc 313 of 0 as omits the weighted prediction.

Figure 4:
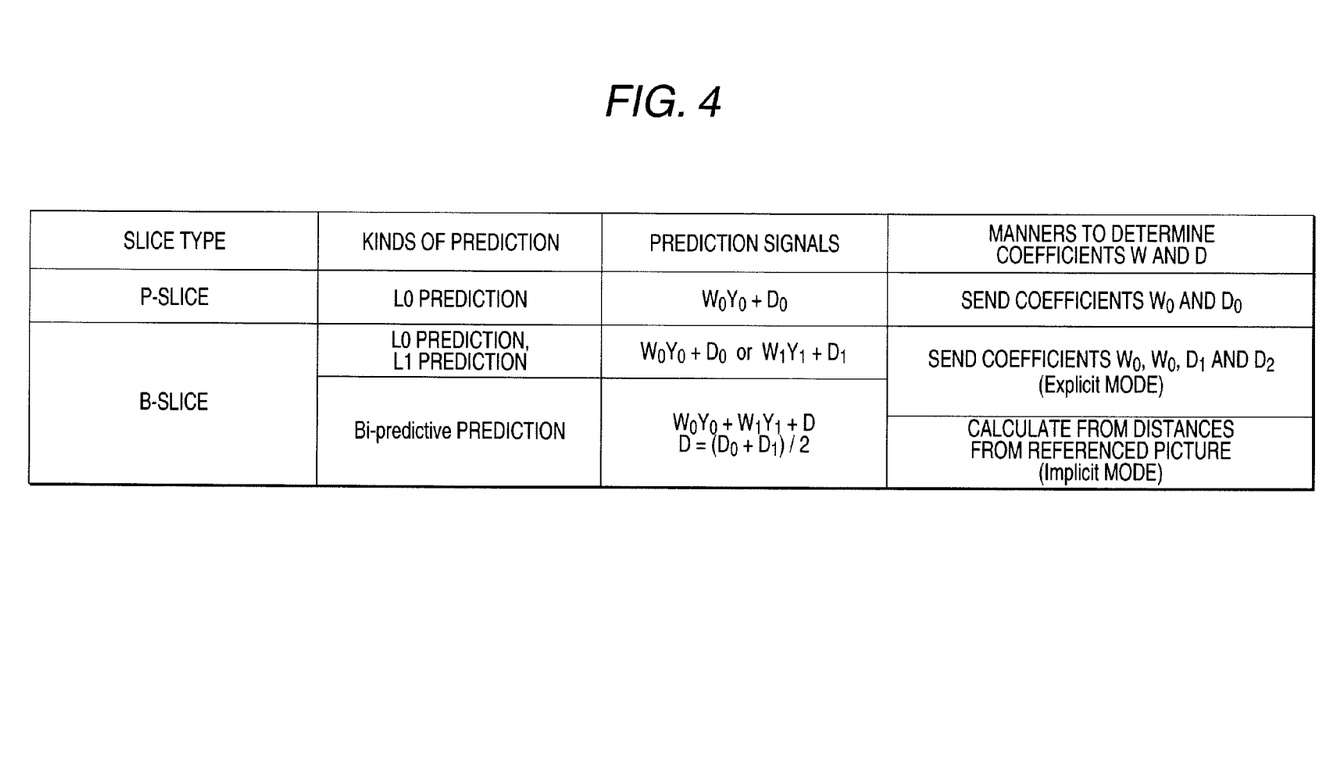
FIG. 4 is a diagram for explaining a weighted prediction of the encoded video sequence to be decoded by the computer.

Next, the weighted prediction is briefly described with reference to FIG. 4 and FIG. 5. In the inter-frame prediction (the L0 prediction) of the P-slice and the prediction mode (the L0 prediction or the L1 prediction) using only one referenced picture in the B-slice, a weighted prediction signal of W0Y0+D0 (or W1Y1+D1) is generated by multiplying a motion compensation prediction signal Y0 or Y1 by a weight coefficient W0 or W1 and by adding an offset coefficient D0 or D1 to that product.

In the bi-predictive prediction of the B-slice using two referenced pictures, the weighted prediction signal of W0Y0+W1Y1+D is generated by multiplying the two motion compensation prediction signals Y0 and Y1 individually by weight coefficients W0 and W1 and by adding a coefficient D (D=(D0+D1)/2).

Here, in case the weighted prediction is used in the P-slice, the slice-header of the encoded video bit stream 251 is transmitted with the weighting coefficients W0 and D0.

In case the weighted prediction is used in the B-slice, on the other hand, the slice-header is transmitted with the weighting coefficients W0, W1, D0 and D1 in the encoded video bit stream 251. In the bi-predictive prediction, the mode used is switched between an explicit mode using the coefficients sent and an implicit mode calculating the coefficients according to the distances from the referenced picture. In case the weighting coefficient is included in the encoded video bit stream 251, it is detected by the entropy decoder 213, and is inputted as the control signal 252 to the weighted predictor 231.

Figure 5:
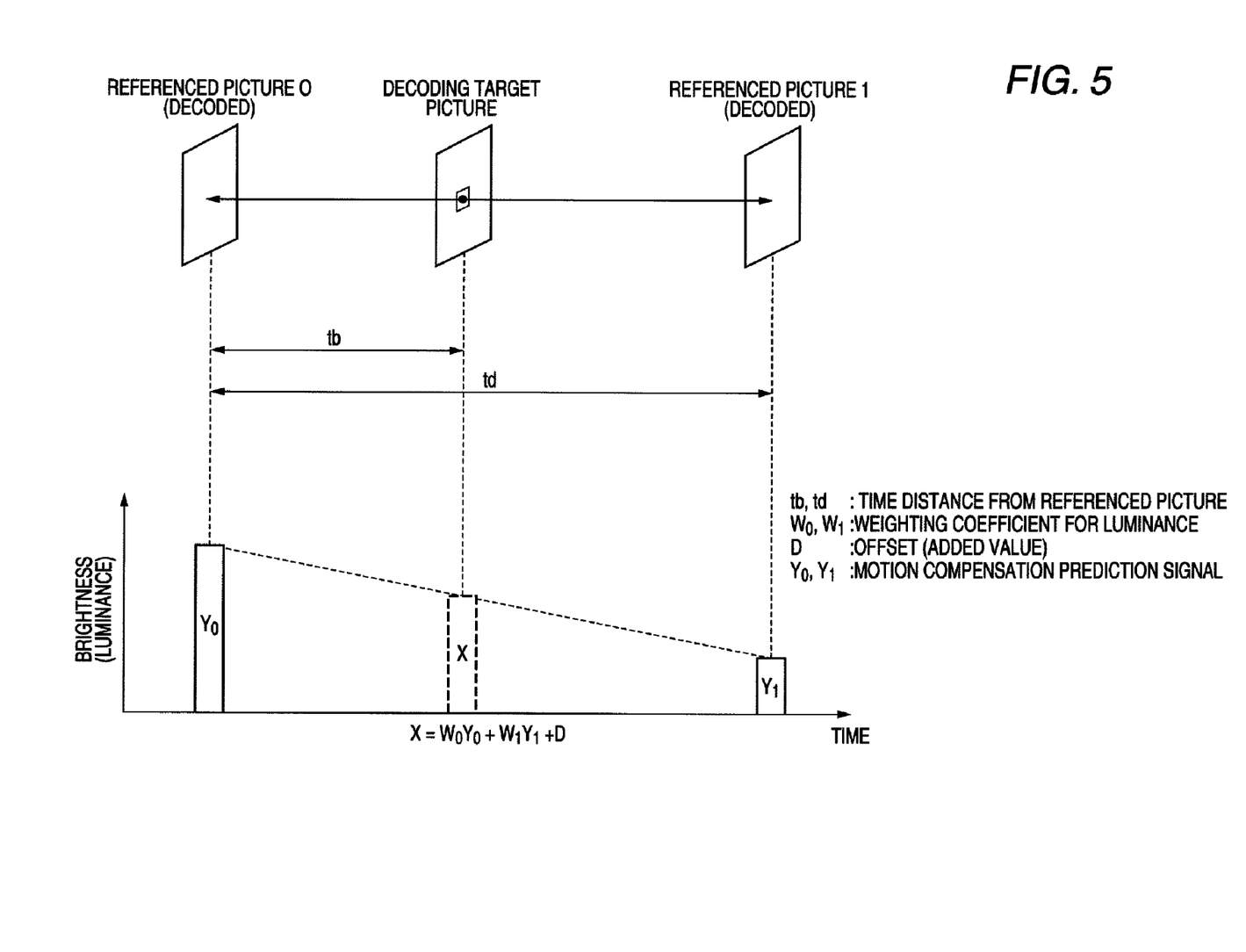
FIG. 5 is a diagram for explaining the weighted prediction of the encoded video sequence to be decoded by the computer.

Here, an example of the weighted prediction is described on the bi-prediction of the B-slice with reference to FIG. 5. The weighted prediction is a luminance prediction effective for an image having a brightness varying with the time, such as a video (fade-in), in which a dark screen grows brighter, or an image having a brightness varying with the time, such as a video (fade-out).

In case the decoding target picture refers to the referenced picture 0 or 1 and in case the referenced picture 0 has a luminance Y0 whereas the referenced picture 1 has a luminance Y1, the luminance of the decoding target picture can be determined as W0Y0+W1Y1+D, as has been described hereinbefore.

In the embodiment, in case the picture in the encoded video bit stream 251 encoded by the weighted prediction is the non-referenced B-picture, or in case the decoding operation is delayed to detect that the operation load of the CPU 111 is heavy, the decoding operation using the weighted prediction omitted, and the motion compensation prediction signal 263 is made into the inter-frame prediction signal 267.

Here, the referenced picture is assumed to be the picture, which is used as a reference image when the inter-frame prediction is made with another picture. At the same time, the non-referenced picture is assumed to be the picture, which is not used as the reference image when the inter-frame prediction is made with another picture.

Figure 6:
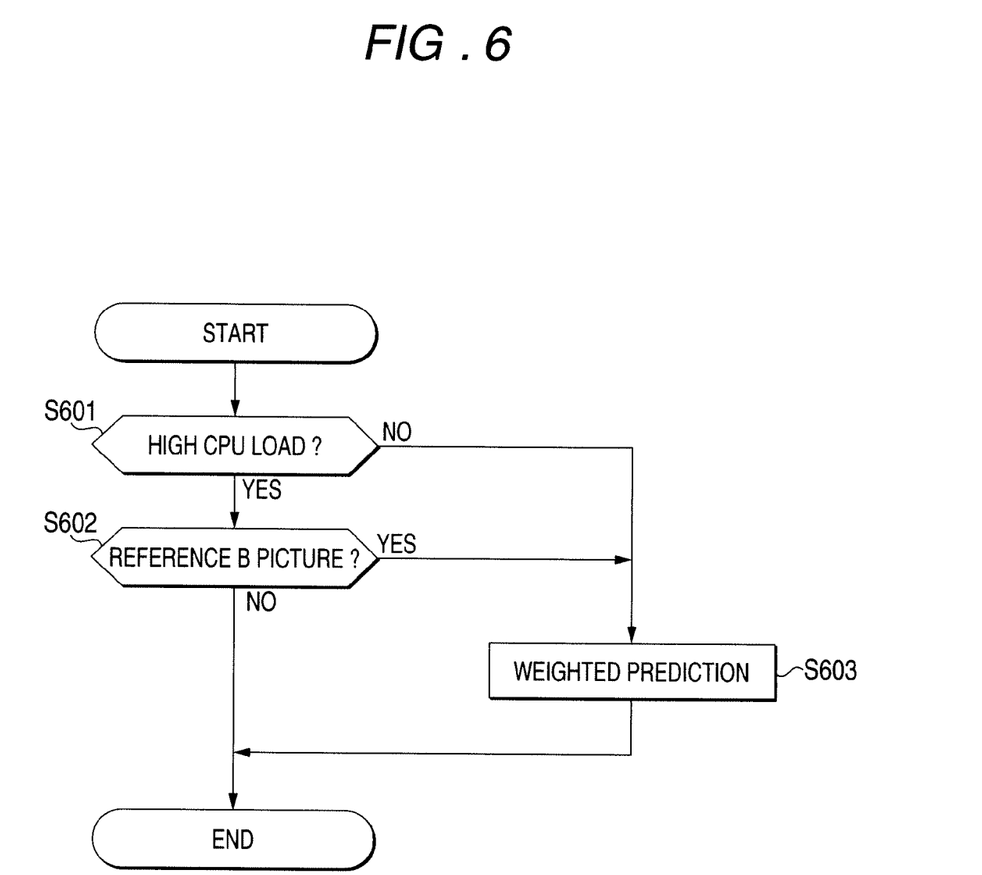
FIG. 6 is a flow chart showing a flow of operations of the weighted prediction of the computer.

A flow of the weighted predicting operations of the decoding program 20 is described in the following with reference to FIG. 6. FIG. 6 is a flowchart showing the flow of the weighted predicting operations by the decoding program 20.

First, the CPU load detector 227 of the decoding program 20 decides (S601) whether or not the CPU load is high. This decision can be made on whether or not the decoding operation is delayed, for example, as has been described hereinbefore.

If the CPU load is high (i.e., Yes at S601), it is decided (S602) whether or not the decoding target picture is the non-referenced B-picture. In case the CPU load is low (i.e., No at S601) so that no delay occurs in the decoding operation, and in the case of the referenced B-picture (i.e., Yes at S602), the switch 229 causes the weighted predictor 231 to perform the weighted prediction thereby to make the weighted prediction signal 265 into the inter-frame prediction signal 267.

In case, on the other hand, the CPU loads high (i.e., Yes at S601) so that the decoding target picture is the non-referenced B-picture (i.e., No at S602), the switch 229 omits the weighted prediction thereby to make the motion compensation prediction signal 263 into the inter-frame prediction signal 267.

According to the embodiment, as has been described hereinbefore, the amounts of the decoding operation can be reduced by omitting the weighted prediction such as the non-referenced B-picture. Especially in case the decoding is performed in the GPU 117 and in case the processing speed of the weighted prediction is slow, the occurrence of delay can be suppressed by omitting the weighted prediction.

By concentrating the omission of the weighted prediction into the non-referenced B-picture, moreover, the error resulting from the omission of the weighted prediction can be prevented from propagating to another picture.

As described with reference to the embodiment, there is provided a video decoding device, which can reduce the load of a decoding operation while suppressing the deterioration of an image quality.

What is claimed is:
1. A video decoding device comprising:
   a decoder that decodes an encoded video bit stream to generate a prediction error signal;
   a motion compensator that performs a motion compensation prediction using a motion vector that refer at least one picture to generate a motion compensation prediction signal;
   a weighted predictor that generates a weighted prediction signal from a linear sum of (1) a product of the motion compensation prediction signal and a first weighting coefficient and (2) a second weighting coefficient;

a selector that selects one of the motion compensation prediction signal and the weighted prediction signal; and an adder that adds (1) selected one of the weighted prediction signal and the motion compensation prediction signal and (2) the prediction error signal, wherein the selector selects the motion compensation prediction signal as the signal to be added to the prediction error signal, when a target picture subjected to the decoding by the decoder is a non-referenced picture referred by none of other pictures.

2. A video decoding device according to claim 1 further comprising a load detector that detects a processing load, wherein the selector selects the signal to be added in accordance with the processing load detected by the load detector.

3. A video decoding method comprising:

decoding an encoded video bit stream to generate a prediction error signal;

performing a motion compensation prediction using a motion vector that refers at least one picture to generate a motion compensation prediction signal;

generating a weighted prediction signal from a linear sum of (1) a product of the motion compensation prediction signal and a first weighting coefficient and (2) a second weighting coefficient;

selecting one of the motion compensation prediction signal and the weighted prediction signal; and adding (1) selected one of the weighted prediction signal and the motion compensation prediction signal and (2) the prediction error signal, wherein the motion compensation signal is selected as the signal to be added to the prediction error signal, when a target picture subjected to the decoding by the decoder is a non-referenced picture referred by none of other pictures.

4. The video decoding method according to claim 3 further comprising detecting a processing load, wherein the signal to be added to the prediction signal is selected in accordance with the processing load.

* * * * *